United States Patent [19]

Underwood

[11] Patent Number: 5,003,721

[45] Date of Patent: Apr. 2, 1991

[54] FLY DETERRENT APPARATUS

[76] Inventor: James T. Underwood, 960 Albion St., San Diego, Calif. 92106

[21] Appl. No.: 461,331

[22] Filed: Jan. 5, 1990

[51] Int. Cl.⁵ .............................................. A01M 1/00
[52] U.S. Cl. .................................................. 43/132.1
[58] Field of Search ...................... 43/138, 132.1, 113; 99/421 HH

[56]  References Cited

U.S. PATENT DOCUMENTS

| | | | |
|---|---|---|---|
| 2,737,753 | 3/1956 | Bittner | 43/113 |
| 3,120,075 | 2/1964 | Barnhart | 43/113 |
| 4,438,585 | 3/1984 | Slatton | 43/113 |

FOREIGN PATENT DOCUMENTS 1039263 10/1953 France ................................. 43/138

Primary Examiner—Kurt Rowan
Assistant Examiner—James Miner
Attorney, Agent, or Firm—Charles C. Logan, II

[57]  ABSTRACT

A fly deterrent apparatus that has been designed to keep flies from landing on open food placed on a table. The apparatus has a housing having a top wall into which is detachably received a vertically oriented shaft. A plunger assembly receives the shaft. A wand holder is adjustably mounted on the shaft. An elongated flexible wand is horizontally oriented with its rear end detachably captured by the wand holder. A D.C. motor, a plurality of D.C. batteries, and a switch are connected by electrical wires to form a closed circuit and they are all mounted within a housing. The switch is of the push-on/push-off type and it is structurally connected to the shaft so a predetermined amount of vertical displacement of the shaft will cause the motor to start rotating the shaft thereby causing the elongated wand to travel over the food set on the table top and create a visual disturbance that discourages flies from landing on the uncovered food.

7 Claims, 2 Drawing Sheets

U.S. Patent  Apr. 2, 1991  Sheet 1 of 2  5,003,721
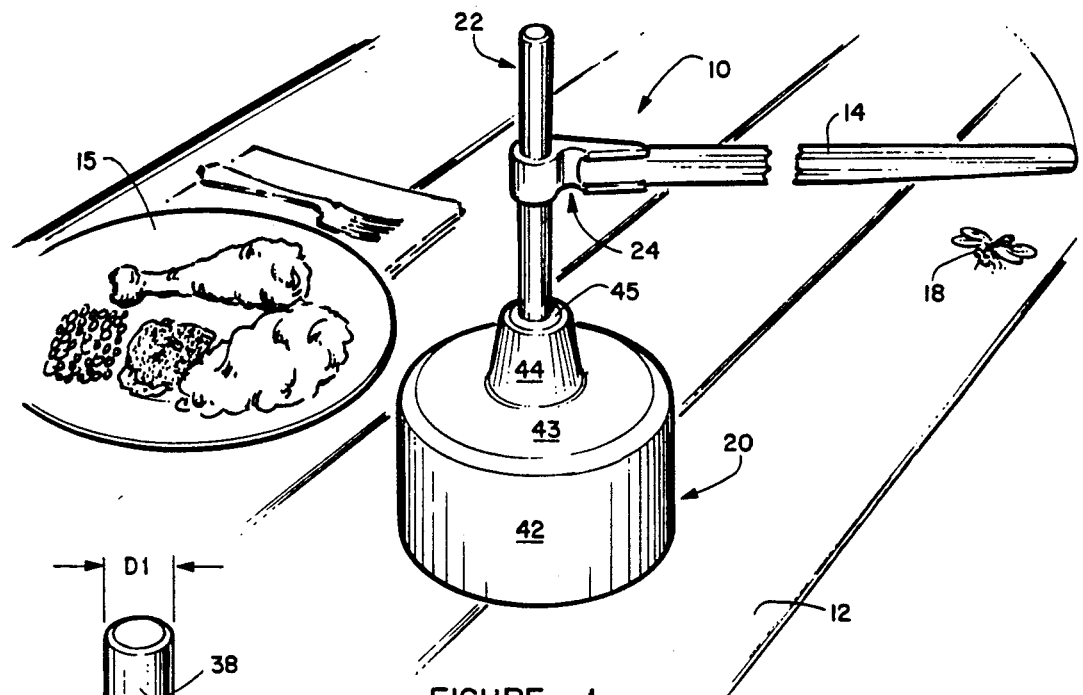
FIGURE 1
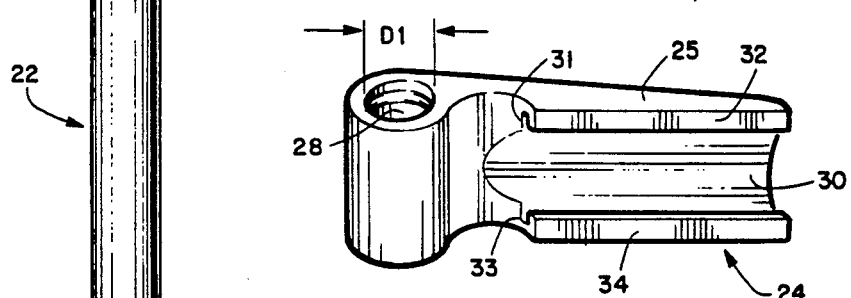
FIGURE 2
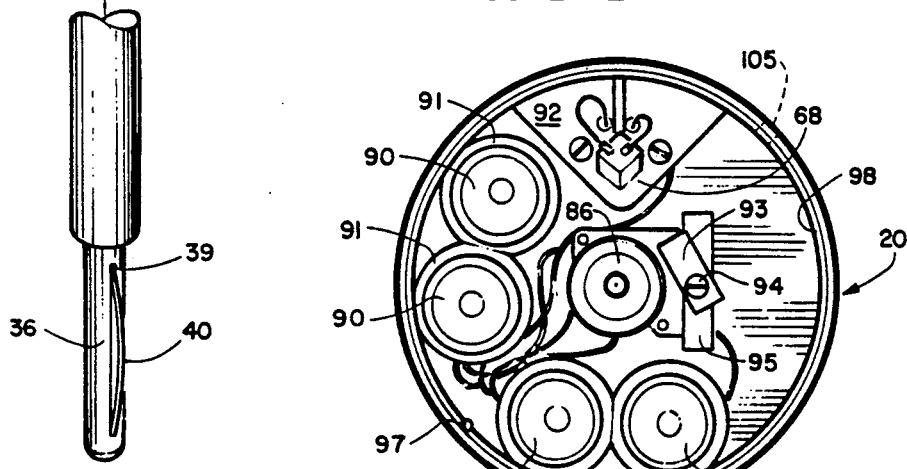
FIGURE 3
FIGURE 4

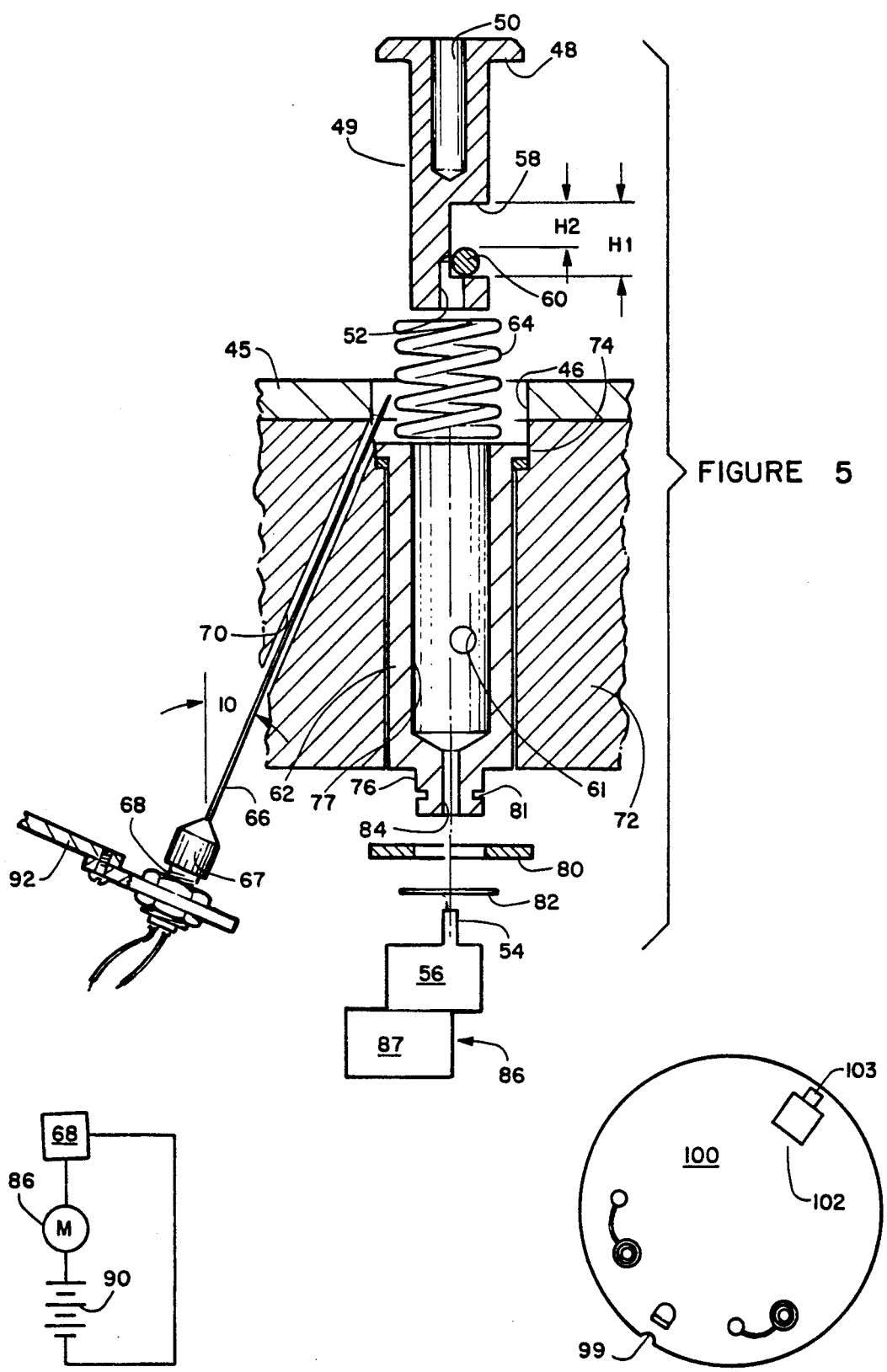

FLY DETERRENT APPARATUS

BACKGROUND OF THE INVENTION

The invention relates to a device for keeping flies from landing on platters of uncovered food served on a table.

Previous attempts have been made to design devices for killing or keeping flies and other insects away from open food. One example is illustrated in the Bittner U.S. Pat. No. 2,737,753. He uses a whipping element 20 that rapidly rotates in a plane adjacent a light that attracts insects for the purpose of striking and destroying the insects. Another device is illustrated in the White U.S. Pat. No. 3,258,200 that shows the use of a propeller turned at a high rate of velocity for the purpose of directing an air stream across the food area on the top of a picnic table in order to prevent flies from landing on the food.

The White U.S. Pat. No. 3,446,428 discloses an overhead suspended and mobile insect repelling apparatus that establishes a boundary layer of forced air around a given area, such as a picnic area, a work bench, or a hammock.

The Tasmia U.S. Pat. No. 4,251,945 discloses a light fixture incorporating a motorized insect exterminator. A filament is rotated at a rapid rate of speed in front of a light source that attracts the fly and it is fatally hit by the revolving impeller as it attempts to fly toward the light.

It is an object of the invention to provide a novel fly deterrent apparatus that can be placed upon a table top for the purpose of preventing flies from landing on food that has been spread on the table top.

It is also an object of the invention to provide a novel fly deterrent apparatus that is portable and contains its own source of power.

It is another object of the invention to provide a novel fly deterrent apparatus that has an elongated flexible wand that is rotated at a slow speed over the food on a table top for the purpose of providing a distraction to a fly such that it would not enter the area covered by the rotating wand.

It is a further object of the invention to provide a novel fly deterrent apparatus that is economical to manufacture and market.

SUMMARY OF THE INVENTION

The novel fly deterrent apparatus has been designed to create a disturbance to deter flies from landing on food that has been set on a table. The apparatus is completely portable and it has a D.C. battery power source that drives its motor.

The apparatus is compact and has clean design lines. The shaft is removable from the top of the housing. The wand holder and elongated flexible wand are also easily disassembled for easy storage.

The housing has a removable bottom wall that provides access to four tubular sleeves within which batteries are inserted. The electrical circuit includes these batteries in series with a switch and a motor assembly. There is structure connecting the drive shaft of the motor assembly to the shaft whose bottom end is removably mounted in the top wall of the housing.

The wand holder has a tubular member formed at its rear end that slides over the shaft and frictionally engages it thereon. The height of the wand holder can be adjusted along the entire height of the shaft. The elongated flexible wand is made of a soft and pliable material such as high impact styrene. The wand is flexible and since it is not rotated at a high rpm, it does not pose an injury threat to anyone that may accidently get struck by the wand when it is rotating. The wand holder has a concave front face portion and the wand is pressed snuggly thereagainst. As the wand seeks to return to its original flat state, it is caught just short of that state by upper and lower grooves. This keeps the wand snuggly in place as it automatically continues to exert pressure with its edges on the upper and lower grooves. To remove the wand, one merely pulls outwardly away from the shaft and it will slide freely out of the grooves.

The rotational motion of the fly deterrent apparatus is started and stopped alternately by simply pressing momentarily on the top of the shaft. The downward motion of this shaft transmits movement to the plunger that is mounted in the top wall of the housing. The plunger has an annular flange that transmits its travel to the switch actuating rod of the push-on/push-off switch mounted in the housing.

DESCRIPTION OF THE DRAWINGS

FIG. 1 is a perspective view illustrating the manner in which the novel fly deterrent apparatus is used;

FIG. 2 is a front perspective view of the wand holder;

FIG. 3 is a front perspective view of the shaft;

FIG. 4 is a bottom plan view of the housing with its cover removed;

FIG. 5 is a partial cross sectional view showing the components that are mounted within the housing in an exploded view;

FIG. 6 is an schematic diagragm of the electrical circuit; and

FIG. 7 is a top plan view of the bottom cover.

DESCRIPTION OF THE PREFERRED EMBODIMENT

The novel fly deterrent apparatus will now be described by referring to FIGS. 1-7 of the drawings. The fly deterrent apparatus is generally designated numeral 10.

In FIG. 1, fly deterrent apparatus is illustrated in position on a table top 12 so that its flexible wand 14 passes over the plate 15 of food when it rotates in its horizontal plane. The motion of the flexible wand 14 provides a distraction for the fly 18 thus causing it to remain outside the perimeter of the circle of the rotating wand.

Fly deterrent apparatus 10 also has a housing 20, a shaft 22, and a wand holder 24. Wand holder 24 has an elongated body portion 25 and a tubular member 28 at its rear end. Bore hole 28 has a diameter D1 which is substantially equal to the diameter of shaft 22 so that it may be adjusted vertically along shaft 22 and held in position by friction or by an O-ring. Elongated body portion 25 has a concave front face portion, an upper groove 31, an upper flange 32, a lower groove 33, and a lower flange 34.

Shaft 22 has a rod member 36 whose upper end is inserted into tubular sleeve 28. A groove 39 receives the opposite ends of linear wire spring 40.

Housing 20 has a cylindrical wall portion 42 a horizontal wall 43, a frusto-conical wall portion 44 and a top wall 45.

The structure within housing 20 is best understood by referring to FIGS. 4 and 5. Top wall 45 has a bore hole 46 whose diameter is such that the annular flange on plunger 49 can be inserted therein. Plunger 49 has a bore hole 50 formed in its top surface for detachably receiving rod member 36 of shaft 22. A clearance bore hole 52 is formed in the bottom of plunger 49 to give clearance for the drive shaft 54 of gear reducer 56. A recess 58 is formed in the side wall of plunger 49 and it has a height H1. Retaining pin 60 passes through aperture 61 in tubular sleeve 62 to lock them together. Coiled spring 64 keeps plunger 49 in its upper most position. When shaft 22 is pushed downwardly its travel is restricted to a distance H2 which causes annular flange 48 to contact the upper tip of switch actuating rod 66 that is connected to cylindrical member 67 of the push-off/push-on switch 68. Switch actuating rod 66 is oriented at approximately a 10 degree angle to vertical and it passes through a bore hole 70 in plug 72.

Tubular sleeve 62 has an annular flange 74 at its top end and a cylindrical portion 76 of a reduced diameter at its bottom end. It has a bore 77 that telescopically receives plunger 49. The structure for locking tubular sleeve 62 in position includes a washer 80, an annular groove 81 and a C-shaped snap ring 82 that fits in annular groove 81. A hemi-cylindrical motor shaft bore 84 receives drive shaft 54. Motor assembly 86 has a motor 87 and a gear reducer 56.

The electrical circuit for the fly deterrent apparatus is illustrated in FIG. 6. Four C sized batteries 90 are in series with motor assembly 86 and push-on/push-off switch 68.

The structure in the interior of the bottom of housing 20 is best understood by looking at FIGS. 4 and 7. A plurality of tubular sleeves 91 removably receive batteries 90. Support bracket 92 has push-on/push-off switch 68 mounted thereon. Electric wires connect the batteries 90 in series to motor 86 which is captured by latch arm 93 that pivots about screw 94 attached to mounting block 95. An alignment pin 97 extends upwardly from shoulder 98 and it mates with alignment recess 99 of bottom cover 100. A latch assembly 102 has a spring loaded latch finger 103 that is detachably captured in latch recess 105 of cylindrical portion 42. The top surface of bottom cover 100 has part of the electrical circuit mounted thereon for connecting the batteries 90 in series.

What is claimed is:

1. A fly deterrent apparatus comprising:
a housing having a top wall;
a vertically oriented shaft having a top end, a bottom end and a predetermined diameter D1, said shaft having a vertical axis;
means for rotatably mounting the bottom end of said shaft in the top wall of said housing;
an elongated wand having a predetermined length, said wand having a front end, a rear end and a longitudinally extending axis, said wand being made of flexible material such that when it is rotated in a horizontal plane its longitudinal axis assumes a curved arc configuration; and
means for detachably connecting the rear end of said wand to said shaft comprising a wand holder having an elongated body portion having a front end, a rear end, and a front face, a vertically oriented tubular member is formed on said rear end and it has a diameter to frictionally engage said shaft, the front face of said wand holder has a horizontally extending concave front face portion that is vertically surrounded by an upper groove, an upper flange, a lower groove and a lower flange.

2. A fly deterrent apparatus as recited in claim 1 further comprising means for adjusting the vertical position of the rear end of said wand on said shaft.

3. A fly deterrent apparatus as recited in claim 1 wherein said wand is made of a flexible strip of plastic material.

4. A fly deterrent apparatus as recited in claim 3 wherein said material is a flat strip of high impact styrene.

5. A fly deterrent apparatus as recited in claim 1 wherein said means for rotating the bottom end of said shaft comprises:
a D.C. motor;
a plurality of D.C. batteries;
a switch; and
a plurality of electrical wire conductors connecting said motor, said batteries and said switch in a closed circuit.

6. A fly deterrent apparatus comprising:
a housing having a top wall;
a vertically oriented shaft having a top end, a bottom end and a predetermined diameter D1, said shaft having a vertical axis;
means for rotatably mounting the bottom end of said shaft in the top wall of said housing comprising a vertically oriented plunger having a top end and a bottom end, a bore hole is formed in said top end for detachably receiving the bottom end of said shaft, a tubular sleeve having a top end and a bottom end, a bore hole is formed in said top end for telescopically receiving said plunger, means to lock said plunger and tubular sleeve together so that they rotate together as one unit, and a motor assembly having a drive shaft, the bottom end of said tubular sleeve having a drive shaft bore hole;
an elongated wand having a predetermined length, said wand having a front end, a rear end and a longitudinally extending axis, said wand being made of flexible material such that when it is rotated in a horizontal plane its longitudinal axis assumes a curved arch configuration; and
means for detachably connecting the rear end of said wand to said shaft so that it may be rotated in a horizontal plane.

7. A fly deterrent apparatus as recited in claim 6 further comprising an electrical switch mounted within said housing and means connecting said electrical switch to said plunger whereby a predetermined amount of downward movement of said shaft will displace said plunger downwardly and close an electrical circuit that includes said motor assembly thereby causing said shaft to be rotated.

* * * * *